United States Patent
Morton et al.

(10) Patent No.: US 11,488,233 B2
(45) Date of Patent: Nov. 1, 2022

(54) METHOD AND SYSTEM FOR ORDERING GOODS AND/OR SERVICES USING THE EMOJI CHARACTER SET VIA COMMUNICATION NETWORK

(71) Applicant: Fooji LLC, Lexington, KY (US)

(72) Inventors: Gregg Alan Morton, Lexington, KY (US); Erik Michael Zamudio, Loveland, OH (US)

(73) Assignee: Fooji, Inc., Lexington, KY (US)

(*) Notice: Subject to any disclaimer, the term of this patent is extended or adjusted under 35 U.S.C. 154(b) by 0 days.

(21) Appl. No.: 15/159,364

(22) Filed: May 19, 2016

(65) Prior Publication Data
US 2016/0343062 A1 Nov. 24, 2016

Related U.S. Application Data (60) Provisional application No. 62/164,477, filed on May 20, 2015.

(51) Int. Cl.
*G06Q 30/00* (2012.01)
*G06Q 30/06* (2012.01)
*G06Q 50/12* (2012.01)
*H04W 4/12* (2009.01)
*H04M 1/72439* (2021.01)

(52) U.S. Cl.
CPC ......... *G06Q 30/0635* (2013.01); *G06Q 50/12* (2013.01); *H04W 4/12* (2013.01); *H04M 1/72439* (2021.01)

(58) Field of Classification Search
CPC ..... G06Q 30/0601–0645; G06Q 30/08; G06Q 50/12; H04W 4/12; H04M 1/72439
USPC .............................................. 705/26.1–27.2
See application file for complete search history.

(56) References Cited

U.S. PATENT DOCUMENTS

| | | | | |
|---|---|---|---|---|
| 5,960,411 | A * | 9/1999 | Hartman | G06Q 10/087 705/26.8 |
| 9,391,945 | B1 * | 7/2016 | Daniel | H04N 5/765 |
| 2007/0106568 | A1 * | 5/2007 | Asher | G06Q 30/0635 705/26.81 |
| 2011/0320319 | A1 * | 12/2011 | Streich | G06Q 30/06 705/27.1 |
| 2012/0209643 | A1 * | 8/2012 | Drew | G06Q 30/012 705/7.11 |

(Continued)

OTHER PUBLICATIONS

"Too Hangry to Think? The Hangry App Will Suggest a Random Order for You on the Spot," Jan. 2015, (https://web.archive.org/web/20150122220224/http://www.thedailymeal.com/news/eat/too-hangry-think-hangry-app-will-suggest-random-order-you-spot/11515).*

(Continued)

*Primary Examiner* — Jeffrey A. Smith
*Assistant Examiner* — Lindsey B Smith
(74) *Attorney, Agent, or Firm* — Nixon & Vanderhye P.C.

(57) ABSTRACT

An order for a product or service can be processed over a global network using emoji characters. A system server establishes a platform for a user to place a request order for the product or service, and the user is enabled to place the request order for delivery of the product or service by depositing an emoji character. The system server maps the emoji character to the product or service. The system server generates a fill order for the product or service and communicates the fill order to a provider, whereupon the system server directs the provider to fulfill the fill order.

11 Claims, 7 Drawing Sheets

(56) References Cited

U.S. PATENT DOCUMENTS

| | | | | |
|---|---|---|---|---|
| 2013/0317921 | A1* | 11/2013 | Havas | G06Q 30/0633 705/15 |
| 2014/0279185 | A1* | 9/2014 | Merz | G06Q 30/0282 705/26.7 |
| 2014/0279418 | A1* | 9/2014 | Rubinstein | G06Q 40/00 705/39 |
| 2015/0088650 | A1* | 3/2015 | Taylor | G06F 17/30684 705/14.54 |
| 2016/0300184 | A1* | 10/2016 | Zamer | G06Q 10/0834 |

OTHER PUBLICATIONS

E. Blass, Pizza Hut serves up SMS ordering: "lg?? w xtra chz, plz", Jan. 20, 2008, engadget.com, accessed at [https://www.engadget.com/2008-01-20-pizza-hut-rolls-out-sms-ordering-lg-w-xtra-chz-plz.html] (Year: 2008).*

* cited by examiner

FIG. 1

6. on Twitter, send tweet containing a food emoji to @gofooji and #gofooji
FIG. 2F 8. fooji Twitter bot replies with delivery time
FIG. 2H 5. account setup success
FIG. 2E 7. fooji Twitter bot replies with success
FIG. 2G

METHOD AND SYSTEM FOR ORDERING GOODS AND/OR SERVICES USING THE EMOJI CHARACTER SET VIA COMMUNICATION NETWORK

CROSS-REFERENCES TO RELATED APPLICATIONS

This application claims the benefit of U.S. Provisional Patent Application No. 62/164,477 filed May 20, 2015, the entire content of which is herein incorporated by reference.

STATEMENT REGARDING FEDERALLY SPONSORED RESEARCH OR DEVELOPMENT (Not Applicable)

BACKGROUND OF THE INVENTION

The invention relates to an order and delivery system for products and services and, more particularly, to an order and delivery system that is configured to allow customers to order products and/or services using the emoji character set.

Internet commerce currently requires a customer to utilize a traditional shopping cart model, whereby users must use a proprietary website or application to add goods and/or services to a cart. During a checkout process, the customer provides relevant order fulfillment and payment information.

Emoji characters are small digital images or icons that are popularly used to express an idea, emotion, message, etc. in electronic communication. There are over 1000 emoji characters encoded in the Unicode Standard, which is a computing industry standard for encoding, representation and handling of text. The emoji character set is one of many symbol sets of the Unicode Standard.

BRIEF SUMMARY OF THE INVENTION

The described embodiments allow customers to order products and/or services by using the emoji character set. The system includes a client interface that can receive messages from a communications network and a server system that generates orders, processes payments, delivers confirmations, and effects delivery of the desired products or services.

In an exemplary embodiment, a method of processing an order for a product or service over a global network includes the steps of (a) a system server establishing a platform for a user to place a request order for the product or service; (b) enabling the user to place the request order for delivery of the product or service by depositing an emoji character; (c) the system server mapping the emoji character to the product or service; and (d) the system server generating a fill order for the product or service and communicating the fill order to a provider, the system server directing the provider to fulfill the fill order.

The system server may generate a client ID that identifies the user and links a user media platform to the user. In this context, step (b) may be practiced by enabling the user to post the emoji character on the user media platform. Step (d) may be practiced by identifying a delivery address based on the client ID, and identifying providers available to fulfill the fill order based on the delivery address. Step (d) may be further practiced by filtering the available providers according to a provider rating. Step (d) may be further practiced by randomly selecting the product or service from one of the filtered available providers based on the emoji character mapped in step (c). The method may further include associating payment means with the client ID, where step (d) may be practiced by accepting payment from the user for the product or service by the payment means. The product or service may comprise food, where the method may further include charging the user a fixed price regardless of a type of food and regardless of the provider.

The method may include enabling the user to input user preferences for the product or service, where step (d) may be practiced according to the user preferences. The method may include enabling the provider to define default values for the product or service.

In another exemplary embodiment, a product/service procurement system includes a network interface enabling a user device running a computer program to request delivery of a product or service by depositing an emoji character, and a system server running a server program. The user device and the system server are interconnected by a computer network. The system server maps the emoji character to the product or service, generates a fill order for the product or service, communicates the fill order to a provider, and directs the provider to fulfill the fill order. A delivery mechanism associated with the provider delivers the product or service to the user.

In yet another exemplary embodiment, a method of placing an order for a product or service includes the steps of enabling a user to access a user information managing system stored on a system server, the user information managing system generating a client ID to identify the user; enabling the user to link the user information managing system to a social media account; and in response to the user posting an emoji character via the social media account: the system server mapping the emoji character to a product or service, the system server sending a request to place an order for the product or service along with an identifier for the user, retrieving user information stored on the server system and matching the user information to the client ID, retrieving emoji information stored on the server system and matching the emoji information to the product or service, the system server generating an order to purchase the product or service based on the information retrieved from the server system, and fulfilling the generated order to complete the purchase of the product or service.

BRIEF DESCRIPTION OF THE DRAWINGS

These and other aspects and advantages will be described in detail with reference to the accompanying drawings, in which.

DETAILED DESCRIPTION OF THE INVENTION

The described embodiments provide a method and system for emoji character set ordering of products and/or services in a client/server environment. The emoji character set ordering system reduces the number of purchaser interactions needed to place and process an order. Reference to "products and/or services" is intended to encompass both immediate transactions (e.g., requesting goods/services instantly—food delivery, electronics, medication, etc.) and delayed transactions (e.g., requesting goods/services for later or ongoing settlement—subscriptions, taxi services, utilities, etc.). Additionally, "products and/or services" as described herein is intended to encompass requests or fulfillment of digital actions/processing (e.g., voting, content delivery, survey input, etc.).

Figure 4:
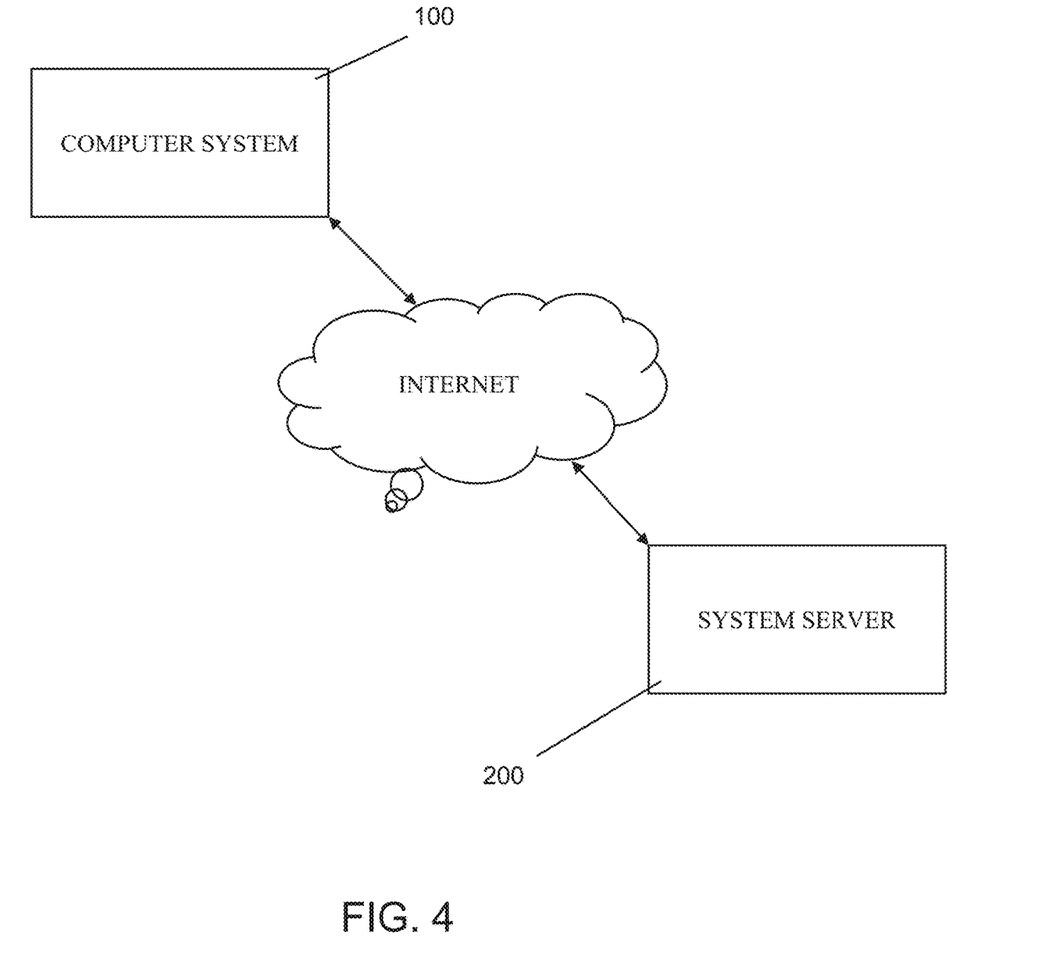
FIG. 4 is a schematic block diagram showing a user computer system access to the system server.

With reference to FIG. 4, the emoji-driven order and delivery system can be achieved using hardware/software modules that form part of a user device/computer system 100. The computer system 100 may be in any form including personal computers, laptops, smart phones, tablets, smart watches, etc. An exemplary computer system 100 is described below with reference to FIG. 5. A system server 200 runs a server program, and the user device 100 and the system server 200 are interconnected by a global computer network, such as the Internet.

Figure 1:
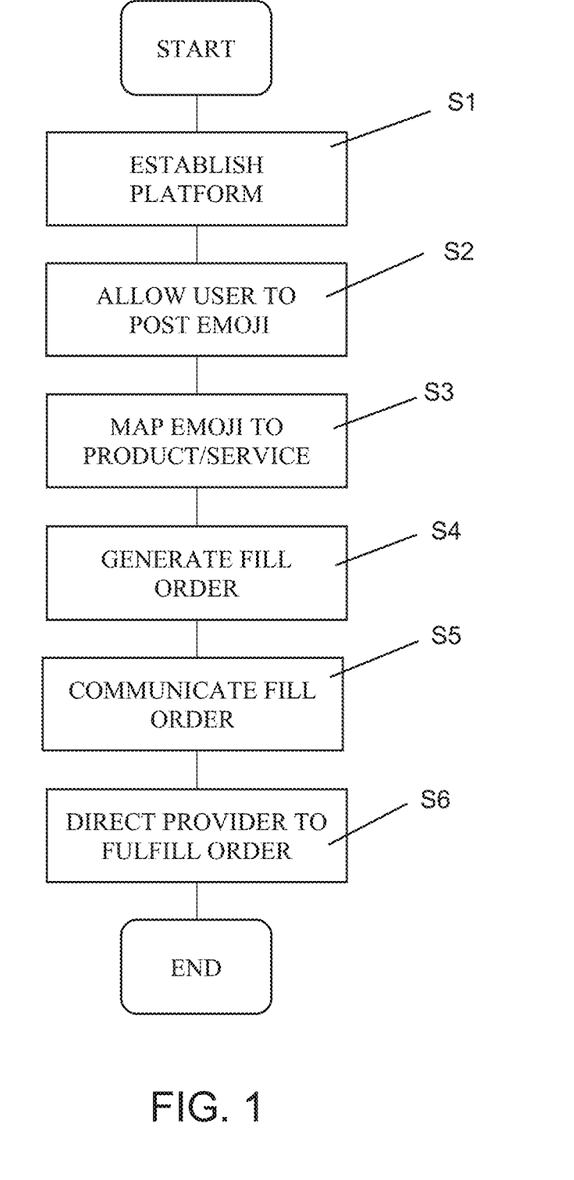
FIG. 1 is a flow diagram of an exemplary process according to the described embodiments.

FIG. 1 is a flow diagram showing the processing of an order for a product or service over a global network. The system server establishes a platform for a user to place a request order for the product or service (S1). The system server enables the user to place the request order for delivery of the product or service by depositing one or more emoji characters (S2). The system server maps the emoji character(s) to the product or service (S3), and the system server generates a fill order for the product or service (S4) and communicates the fill order to a provider (S5). The system server directs the provider to fulfill the fill order (S6).

In one embodiment, the system server includes a user information managing system that generates a client ID packet including a client ID, which identifies the user and links a user media platform (e.g., the user's Twitter® account, Facebook® account, etc.) to the user. In this exemplary application, enabling the user to place the request order is practiced by enabling the user to post the emoji character(s) on the user media platform. In an alternative exemplary application, the user can send the emoji character(s) via text messaging.

In one embodiment, the system server identifies a delivery address based on the client ID and subsequently identifies providers available to fulfill the fill order based on the delivery address. The available providers may then be filtered according to a provider rating. For example, once the set of providers that can fulfill the order is identified, the provider list is further filtered according to a rating criteria. In a food example, the providers must have a minimum rating (e.g., 4 stars) to be included in the list of providers available for fulfilling the order. The system server may generate the fill order by randomly selecting the product or service from one of the filtered available providers based on the mapped emoji character. In the food example, a random menu item may be selected from one of the filtered available providers that matches the mapped emoji character(s) posted by the user.

Payment means may be associated with the client ID, and payment may be accepted from the user for the delivered product or service by the payment means. In the food example, one exemplary implementation may charge the user a fixed price regardless of a type of food and regardless of the provider. For example, a user may be charged a fixed price (e.g., $15.00) for a food order in the food category identified by the emoji character(s). In this example, the system may target menu items in the $12.00-$13.00 range, which includes all fees, taxes, delivery charges, tips, etc. For non-food items, the provider may define default values for the product or service so that the user is fully informed about the requested product or service when posting the corresponding emoji character.

As an alternative to the fixed fee option, the system may enable the user to input user preferences for the product or service, where generating the fill order is practiced according to user preferences. For example, a user may pre-establish a preference for a large pepperoni pizza when the pizza emoji is posted. In this manner, the user will always be provided with a large pepperoni pizza when the user uses the pizza emoji. The user may also set preferences with regard to the provider, delivery time/location, etc.

Figure 2A:
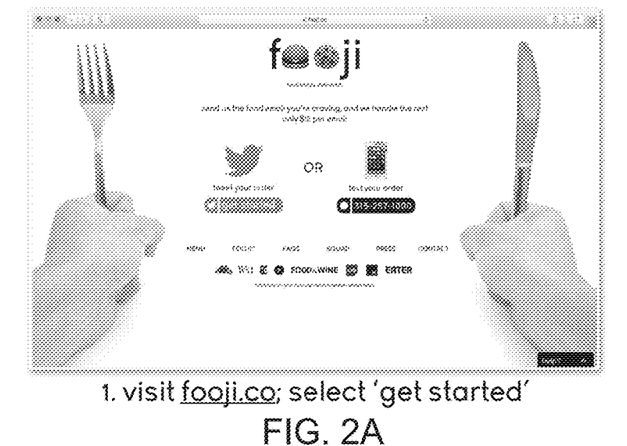
FIGS. 2A-2H are exemplary screenshots that show the user experience using the Twitter® app.
Figure 2B:
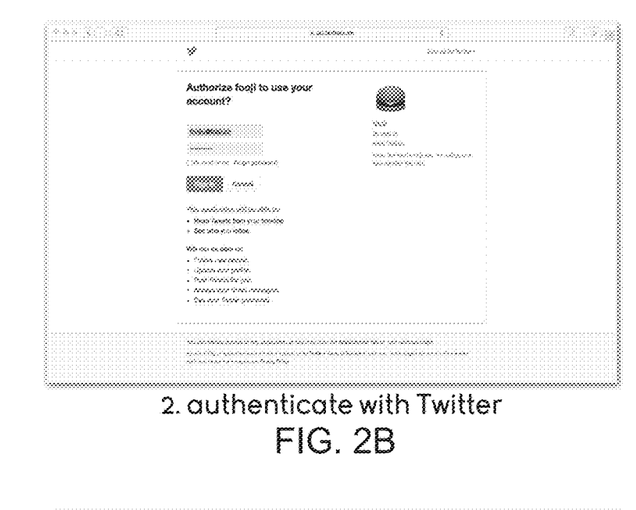
Figure 2C:
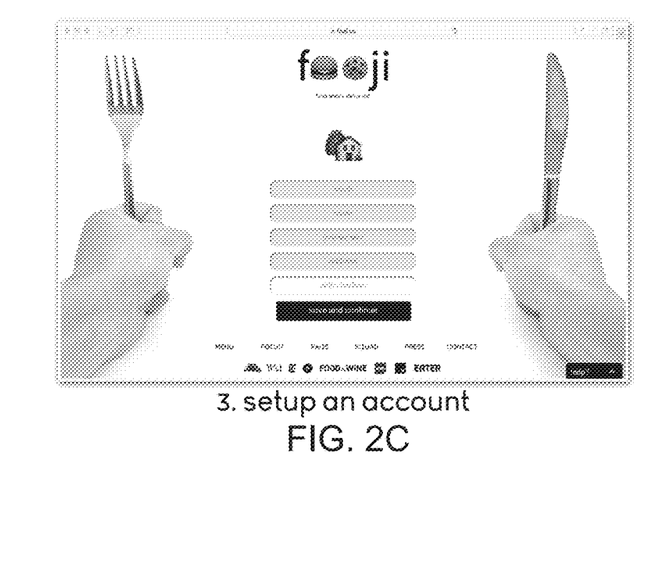
Figure 2D:
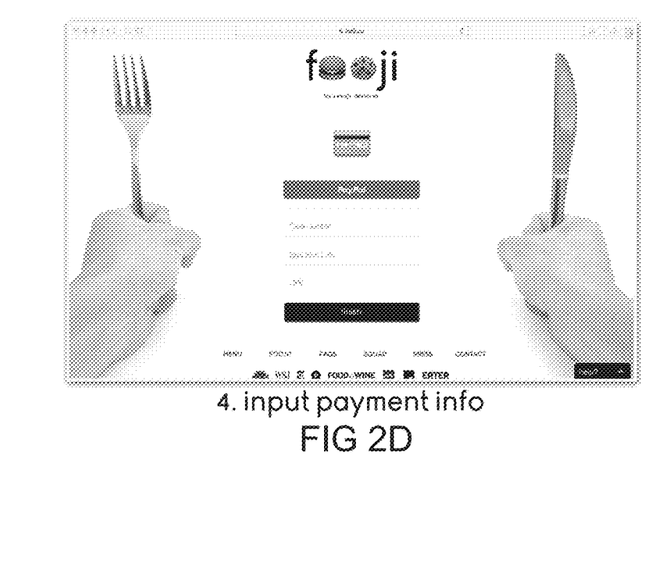
Figure 2E:
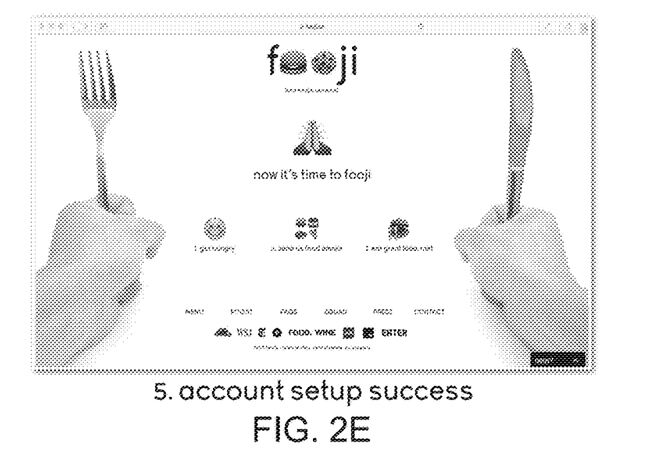
Figure 2F:
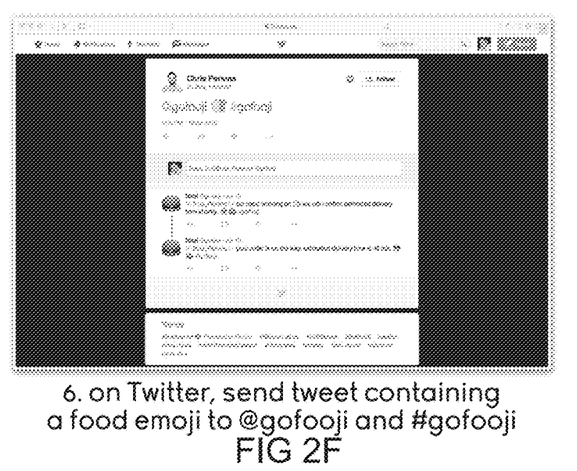
Figure 2G:
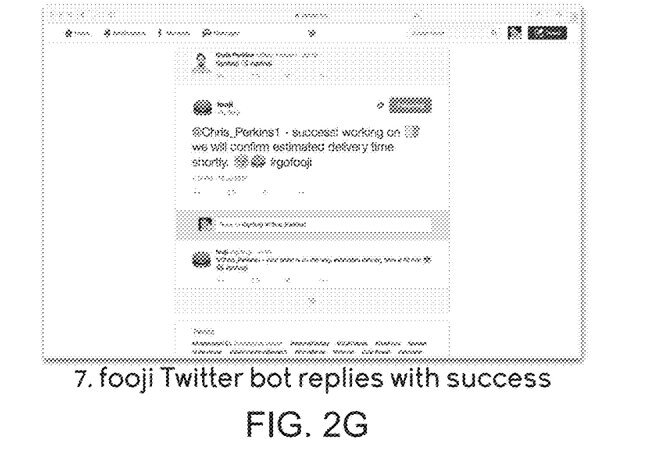
Figure 2H:
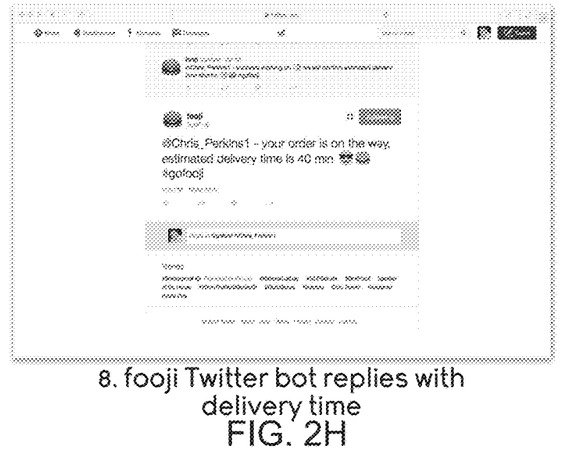

FIGS. 2A-2H are exemplary screenshots that illustrate a user experience ordering a food product using a Twitter® account. The user accesses the server via a website and selects Twitter® for authentication (FIG. 2A). The user links their Twitter® handle with the system (FIG. 2B), sets up an account (FIG. 2C), and inputs payment information (FIG. 2D). The server processes the account and payment information and completes the account setup (FIG. 2E). The user can then send a "tweet" with their order using a food emoji along with predefined symbols/words (FIG. 2F). For example, according to Twitter® protocol, the user may send a "tweet" containing a food emoji to @gofooji and #gofooji. The system Twitter® bot replies with success (FIG. 2G), and subsequently, the system Twitter® bot replies with an estimated delivery time.

Figure 3A:
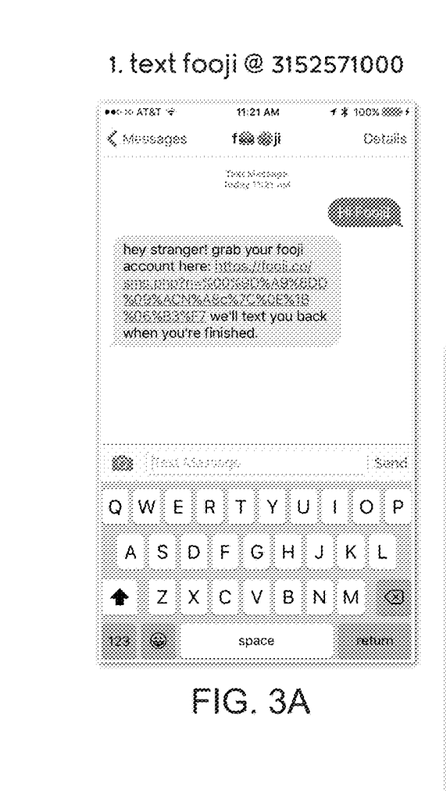
FIGS. 3A-3G are exemplary screenshots that show the user experience using a cell phone/text messaging.
Figure 3B:
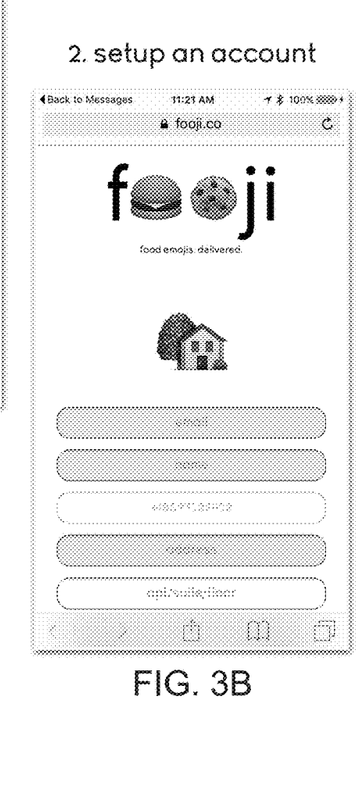
Figure 3C:
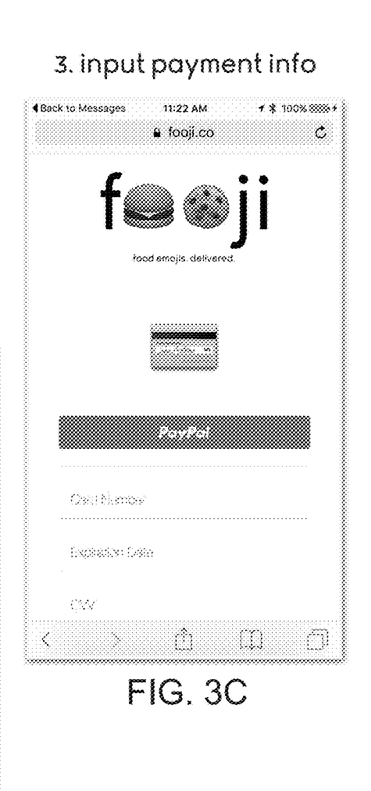
Figure 3D:
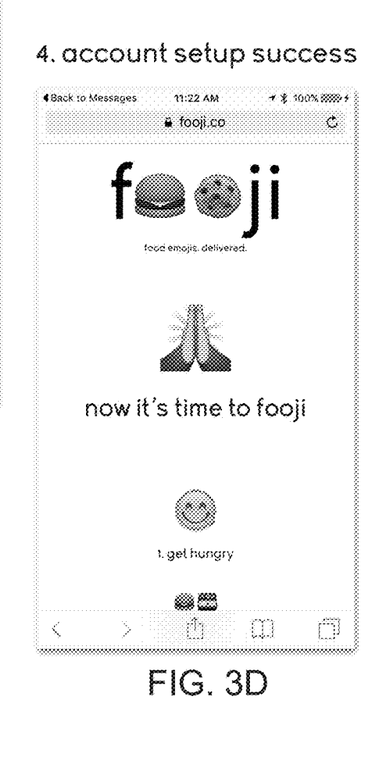
Figure 3E:
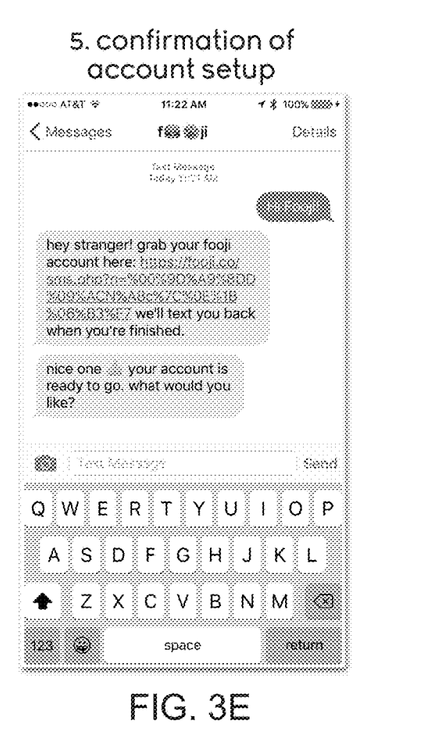
Figure 3F:
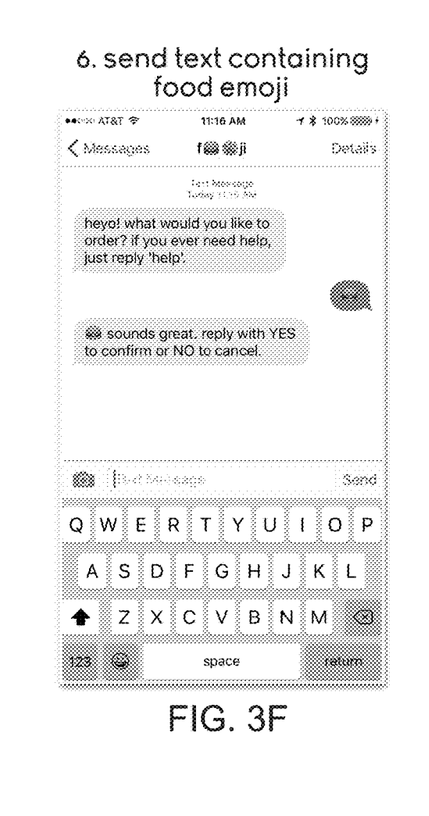
Figure 3G:
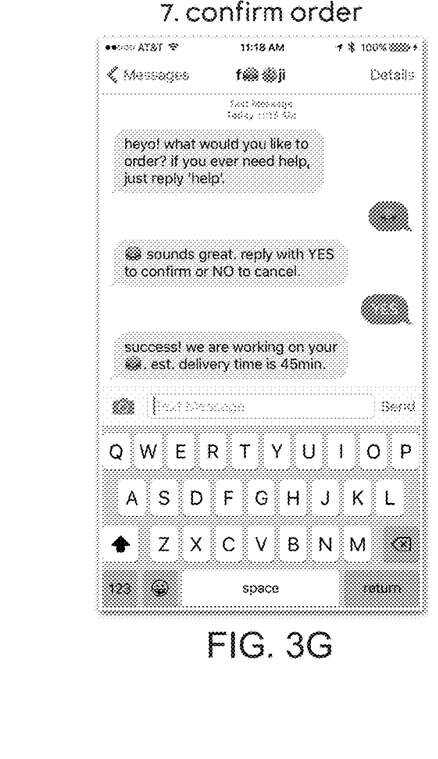

FIGS. 3A-3G are exemplary screenshots that illustrate a user experience ordering a food product with text messaging. The user sends a text message to a system number, and the system sends a text message reply with a link to set up an account (FIG. 3A). The user sets up an account (FIG. 3B) and inputs payment information (FIG. 3C). The server processes the account and payment information and completes the account setup (FIG. 3D), and the system sends a text message to the user to confirm account setup (FIG. 3E). The user can then send a text message with their order using a food emoji, and the system sends a reply acknowledging the order request (FIG. 3F). The system subsequently replies with success and an estimated delivery time (FIG. 3G).

Exemplary products and services that may be associated with an emoji character for which an order request may be processed by the system and method of the described embodiments may include, without limitation: food and/or drinks, purchase or rental of textbooks, sporting event tickets, music event tickets, social event tickets, purchase or rental of a car, taxi/limousine service, office supplies, medicine, photos and/or videos, technological support, rent or reserve venues, purchase or rental of video games, purchase or rental of clothing, flowers and floral arrangements, purchase or rental of hardware, purchase or rental of musical instruments, edible arrangements, entering raffles and/or drawings, aircraft transportation, watercraft transportation, pet/animal food, purchase or rental of prescription glasses, purchase or rental of accessories (apparel), car service, plumbing, money transfers, package/delivery tracking, news information, sporting events information, travel information, grocery delivery, and others.

Figure 5:
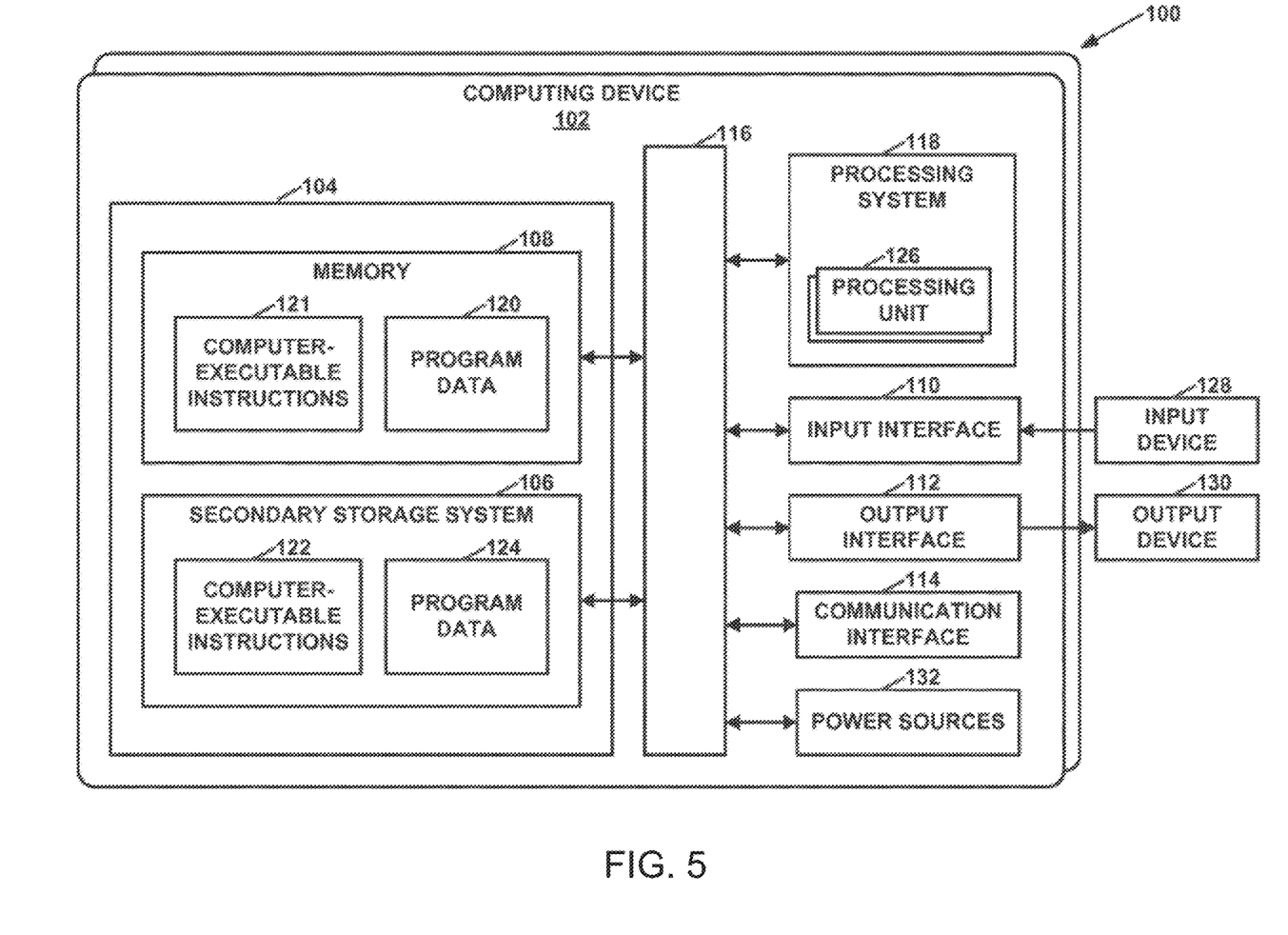
FIG. 5 is a detailed block diagram of an exemplary computer system configuration for implementing the described embodiments.

In some applications, the method and system of the described embodiments are implemented using a computer system. Any known computer configuration capable of carrying out the intended functionality of the preferred embodiments may be used. FIG. 5 is a block diagram of an example configuration of a computer system 100 in which the techniques of this disclosure may be implemented. In the example of FIG. 5, computer system 100 comprises a computing device 102 and one or more other computing devices. Computing device 102 is an electronic device that processes information. In the example of FIG. 5, computing device 102 comprises a data storage system 104, a memory 108, a secondary storage system 106, a processing system 118, an input interface 110, an output interface 112, a communication interface 114, one or more power sources 132, and one or more communication media 116. Communication media 116 enable data communication between processing system 118, input interface 110, output interface 112, communication interface 114, memory 108, and secondary storage system 106. Computing device 102 can include components in addition to those shown in the example of FIG. 5. Furthermore, some computing devices do not include all of the components shown in the example of FIG. 5. Each of components 104, 106, 108, 110, 112, 114, 116, 118, 120, 121, 122, 124, 126, 128, 130, and 132 can be interconnected (physically, communicatively, or operatively) for inter-component communications.

Data storage system 104 is a system that stores data for subsequent retrieval. In the example of FIG. 5, data storage system 104 comprises memory 108 and secondary storage system 106. Memory 108 and secondary storage system 106 store data for later retrieval. In the example of FIG. 5, memory 108 stores computer-executable instructions 121 and program data 120. Secondary storage system 106 stores computer-executable instructions 122 and program data 124. Physically, memory 108 and secondary storage system 106 each comprise one or more computer-readable storage media.

A computer-readable medium is a medium from which a processing system can read data. Computer-readable media include computer storage media and communications media. Computer storage media can further include physical devices that store data for subsequent retrieval. Computer storage media are not transitory. For instance, computer storage media do not exclusively comprise propagated signals. Computer storage media include volatile storage media and non-volatile storage media. Example types of computer storage media include random-access memory (RAM) units, read-only memory (ROM) devices, solid state memory devices, optical discs (e.g., compact discs, DVDs, BluRay discs, etc.), magnetic disk drives, electrically-erasable programmable read-only memory (EEPROM), programmable read-only memory (PROM), magnetic tape drives, magnetic disks, and other types of devices that store data for subsequent retrieval. Communication media includes media over which one device can communicate data to another device. Example types of communication media include communication networks, communications cables, wireless communication links, communication buses, and other media over which one device is able to communicate data to another device.

Referring again to FIG. 5, processing system 118 is coupled to data storage system 104. Processing system 118 reads computer-executable instructions (e.g., 121, 122) from data storage system 104 and executes the computer-executable instructions. Execution of the computer-executable instructions by processing system 118 configures and/or causes computing device 102 to perform the actions indicated by the computer-executable instructions. For example, execution of the computer-executable instructions by processing system 108 can configure and/or cause computing device 102 to provide Basic Input/Output Systems (BIOS), operating systems, system programs, application programs, or can configure and/or cause computing device 102 to provide other functionality.

Processing system 118 reads the computer-executable instructions from one or more computer-readable media. For example, processing system 118 reads and executes computer-executable instructions 121 and 122 stored on memory 108 and secondary storage system 106.

Processing system 118 comprises one or more processing units 126. Processing units 126 comprise physical devices that execute computer-executable instructions. Processing system 118 can also include one or more operating systems that are executable by computing device 102. Processing units 126 comprise various types of physical devices that execute computer-executable instructions. For example, one or more of processing units 126 comprise a microprocessor, a processing core within a microprocessor, a digital signal processor, a graphics processing unit, or another type of physical device that executes computer-executable instructions.

Input interface 110 enables computing device 102 to receive input from an input device 128. Input device 128 comprises a device that receives input from a user. Input device 128 comprises one or more various types of devices that receive input from users. For example, input device 128 comprises a keyboard, a touch screen, a mouse, a microphone, a keypad, a joystick, a brain-computer interface device, or another type of device that receives input from a user. In some examples, input device 128 is integrated into a housing of computing device 102. In other examples, input device 128 is outside a housing of computing device 102.

Output interface 112 enables computing device 102 to output information on one or more output devices 130. One or more output devices 130, in some examples, are configured to provide output to a user using tactile, audio, or video output. For example, an output device 130 is a device that displays output. Example types of display devices include monitors, touch screens, display screens, televisions, and other types of devices that display output. In some examples, output device 130 is integrated into a housing of computing device 102. In other examples, output device 130 is outside a housing of computing device 102. Output devices 130, in one example, includes a presence-sensitive screen or a touch screen. Output devices 130 can utilize a sound card, a video graphics adapter card, or any other type of device for converting a signal into an appropriate form understandable to humans or machines. Additional examples of output devices 130 include a speaker, a cathode ray tube (CRT) monitor, a liquid crystal display (LCD), or any other type of device that can generate intelligible output to a user.

Communication interface 114 enables computing device 102 to send and receive data over one or more communication media. In some examples, computing device 102 utilizes one or more communication interfaces 114 to wirelessly communicate with an external device such as server device or a client device, a mobile phone, or other networked computing device. Communication interface 114 comprises various types of devices. For example, communication interface 114 comprises a Network Interface Card (NIC), a wireless network adapter, a Universal Serial Bus (USB) port, or another type of device that enables computing device 102 to send and receive data over one or more communication media. In some examples, communications interface 114 comprises a network interface to communicate with external devices via one or more networks, such as one or more wireless networks. Examples of communications interface 114 are an Ethernet card, an optical transceiver, a radio frequency transceiver, or any other type of device that can send and receive information. Other examples of such network interfaces include Bluetooth®, 3G and Wi-Fi radios in mobile computing devices. In some examples, communication interface 114 receives configuration data, trial data, and/or other types of data as described above. Furthermore, in some examples, communication interface 114 outputs information and/or other types of data as described above.

Computing device 102, in some examples, includes one or more power sources 132, which may be rechargeable and provide power to computing device 102. In some examples, the one or more power sources 132 are one or more batteries. The one or more batteries could be made from nickel-cadmium, lithium-ion, or any other suitable material. In another example, the one or more power sources 132 include a power supply connection that receives power from a power source external to computing device 102.

The techniques described herein may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described herein. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described herein may also be embodied or encoded in a computer-readable medium, such as a computer-readable storage medium, containing instructions. Instructions embedded or encoded in a computer-readable medium, including a computer-readable storage medium, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media.

In the hardware context, the network interface enables a user device running a computer program to request delivery of a product or service by depositing an emoji character. The system server runs a server program, and the user device and the system server are interconnected by a computer network. The system server maps the emoji character to the product or service, generates a fill order for the product or service, communicates the fill order to a provider, and directs the provider to fulfill the fill order. A delivery mechanism associated with the provider delivers the product or service to the user. The system may also include a client ID packet including a client ID that identifies the user and links a user media platform to the user (e.g., Twitter®, mobile phone, etc.). The network interface is configured to enable the user to post the emoji character on the user media platform to initiate the order request.

The system and methods of the described embodiments enable a customer to place an order through a communications network by sending a message containing emoji characters. In response to the message containing emoji characters, a server system generates and processes an order in accordance with customer information and emoji mapping information. The system and methods eliminate the traditional online shopping cart model using the emoji character set, which results in a streamlined and entertaining ordering process.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A method of processing an order for a product or service over a global network, the method comprising:
   (a) establishing, by a system server, a platform for a user to place a request order for delivery and generating a client ID packet including a client ID that identifies a user and links a user media platform of the user to the system server;
   (b) providing, by the system server, an interface that receives a post from the linked user media platform of the user wherein the post contains an emoji character and wherein the post constitutes completion of the request order for delivery and requires no other input from the user;
   (c) receiving, by the interface of the system server, the emoji character posted by the user via the user media platform;
   (d) automatically mapping, by the system server, the emoji character to the product or service upon the receiving of the emoji character;
   (e) identifying, by the system server, a delivery address based on the client ID packet and identifying available providers that are able to provide the product or service mapped to the emoji character based on the delivery address;
   (f) in response to receiving the emoji character posted by the user and mapping the emoji character to the product or service, automatically generating, by the system server, a fill order for the product or service by randomly selecting an available provider of the identified available providers for fulfillment and randomly selecting a specific product or service provided by the available provider based on the product or service mapped to the emoji character, wherein the fill order comprises the specific product or service and the available provider;

(g) communicating, by the system server, the fill order to the available provider, the system server directing the available provider to fulfill the fill order; and (h) delivering the specific product or service to the user at the delivery address without further input from the user.

2. The method according to claim 1, wherein step (e) is further practiced by filtering the available providers according to a provider rating.

3. The method according to claim 1, further comprising associating payment means with the client ID, wherein step (f) is practiced by accepting payment from the user for the product or service by the payment means.

4. The method according to claim 3, wherein the product or service comprises food, the method further comprising charging the user a fixed price regardless of a type of food and regardless of the available provider.

5. The method according to claim 1, further comprising enabling the user to input user preferences for the product or service, wherein step (f) is practiced according to the user preferences.

6. The method according to claim 1, further comprising enabling the available provider to define default values for the product or service.

7. A product/service procurement system comprising:

a network interface enabling a user device running a computer program to request delivery of a product type or service type solely by depositing an emoji character;

a system server running a server program, the user device and the system server being interconnected by a computer network, the system server being configured for generating a client ID packet including a client ID that identifies a user and links a user media platform of the user to the system server, the system server being further configured for providing an interface that receives a post from the linked user media platform of the user wherein the post contains an emoji character and wherein the post constitutes completion of the delivery request and requires no other input from the user, the interface of the system server being configured for receiving the emoji character posted by the user via the user media platform, the system server being further configured for automatically mapping the emoji character to the product type or service type upon the receiving of the emoji character and automatically acknowledging deposit of the emoji character, the system server being further configured for identifying a delivery address based on the client ID packet and identifying available providers that are able to provide the product type or service type mapped to the emoji character based on the delivery address, the system server being further configured, in response to receiving the emoji character posted by the user and mapping the emoji character to the product type or service type, automatically generating a fill order for the product type or service type by randomly selecting an available provider of the identified available providers for fulfillment and randomly selecting an available product or service of the product type or service type provided by the available provider based on the product type or service type mapped to the emoji character without additional input from the user, wherein the fill order comprises the randomly selected available product or service and the available provider, the system server being further configured for communicating the fill order to the available provider, for directing the available provider to fulfill the fill order, and for automatically replying with an estimated delivery time; and a delivery mechanism associated with the provider that delivers the selected product or service to the user without further input from the user.

8. A method of placing an order for delivery for a product or service comprising:

enabling, by a system server, a user to access a user information managing system stored on the system server, the user information managing system generating a client ID packet including a client ID to identify the user and link a user media platform of the user to the system server;

enabling, by the system server, the user to link the user information managing system to the user media platform;

providing, by the system server, an interface that receives a post from the linked user media platform of the user wherein the post contains an emoji character that constitutes completion of the order for the product or service and requires no other input from the user;

receiving, by the interface of the system server, the emoji character posted by the user via the user media platform; and in response to the user posting the emoji character via the user media platform:

automatically acknowledging, by the system server, receipt of the emoji character, automatically mapping, by the system server, the emoji character to the product or service upon the receiving of the emoji character, identifying, by the system server, a delivery address based on the client ID packet and identifying available providers that are able to provide the product or service mapped to the emoji character based on the delivery address, automatically generating, by the system server, a fill order for the product or service by randomly selecting an available provider of the identified available providers for fulfillment and randomly selecting a specific product or service provided by the available provider based on the product or service mapped to the emoji character, wherein the fill order comprises the specific product or service and the available provider, communicating, by the system server, the fill order to the available provider, the system server directing the available provider to fulfil the fill order, automatically replying, by the system server, with an estimated delivery time, and delivering the product or service to the user at the delivery address also without further input from the user.

9. The method according to claim 8, further comprising, after identifying the available providers, filtering the available providers according to a provider rating.

10. The method according to claim 8, further comprising enabling the user to input user preferences for the product or service, wherein the step of generating the fill order is practiced according to the user preferences.

11. The method according to claim 8, wherein the system server communicates the fill order to the available provider, the method further comprising enabling the available provider to define default values for the product or service.

* * * * *